(12) United States Patent
Goel et al.

(10) Patent No.: US 11,966,402 B2
(45) Date of Patent: *Apr. 23, 2024

(54) CONTEXT DRIVEN DATA PROFILING

(71) Applicant: Collibra Belgium BV, Brussels (BE)

(72) Inventors: Satyender Goel, Chicago, IL (US); Aurko Joshi, West Bloomfield, MI (US); Vicky Froyen, Kessel-Lo (BE); Upwan Chachra, Bothell, WA (US); Pieter De Leenheer, New York, NY (US); James B. Cushman, Longboat Key, FL (US)

(73) Assignee: Collibra Belgium BV, Brussels (BE)

( * ) Notice: Subject to any disclaimer, the term of this patent is extended or adjusted under 35 U.S.C. 154(b) by 355 days.

This patent is subject to a terminal disclaimer.

(21) Appl. No.: 16/844,927

(22) Filed: Apr. 9, 2020

(65) Prior Publication Data

US 2021/0319027 A1 Oct. 14, 2021

(51) Int. Cl.
*G06F 16/2455* (2019.01)
*G06F 16/9035* (2019.01)

(52) U.S. Cl.
CPC .... *G06F 16/24564* (2019.01); *G06F 16/9035* (2019.01)

(58) Field of Classification Search
CPC ............ G06F 16/24564; G06F 16/9035
See application file for complete search history.

(56) References Cited

U.S. PATENT DOCUMENTS

| | | | |
|---|---|---|---|
| 7,809,659 B1 | 10/2010 | Paiz | |
| 10,623,406 B2 | 4/2020 | Maker et al. | |
| 11,294,906 B2 * | 4/2022 | Patel | G06F 16/90344 |
| 11,694,093 B2 | 7/2023 | Perez et al. | |
| 2004/0107203 A1 * | 6/2004 | Burdick | G06F 16/2365 |
| 2016/0246823 A1 | 8/2016 | Vargher et al. | |
| 2016/0283735 A1 * | 9/2016 | Wang | G06F 21/6254 |
| 2018/0293327 A1 * | 10/2018 | Miller | G06F 16/26 |

(Continued)

FOREIGN PATENT DOCUMENTS

| | | |
|---|---|---|
| WO | 01/46889 A2 | 6/2001 |
| WO | 2006076520 A2 | 7/2006 |

OTHER PUBLICATIONS

PCT/IB2021/052964 International Search Report and Written Opinion dated Jul. 21, 2021, 12 pgs.

*Primary Examiner* — Mark D Featherstone
*Assistant Examiner* — Faezeh Forouharnejad
(74) *Attorney, Agent, or Firm* — Perkins Coie LLP

(57) ABSTRACT

The present disclosure relates to methods and systems for processing data via a data profiling process. Data profiling can include modifying attributes included in source data and identifying aspects of the source data. The data profiling process can include processing an attribute according to a set of validation rules to validate information included in the attribute. The process can also include processing the attribute according to a set of standardization rules to modify the attribute into a standardized format. The process can also include processing the attribute according to a set of rules engines. The modified attributes can be outputted for further processing. The data profiling process can also include deriving a value score and usage rank of an attribute, which can be used in deriving insights into the source data.

14 Claims, 7 Drawing Sheets

(56) References Cited

U.S. PATENT DOCUMENTS

| | | |
|---|---|---|
| 2019/0095644 A1 | 3/2019 | Park et al. |
| 2019/0377715 A1* | 12/2019 | Kabra .................. G06F 16/215 |
| 2020/0201940 A1* | 6/2020 | Nelson .................. G06N 20/00 |
| 2021/0004998 A1* | 1/2021 | Poduri .................. G06T 11/206 |

* cited by examiner

CONTEXT DRIVEN DATA PROFILING

TECHNICAL FIELD

This disclosure relates to data profiling, and, in particular, to performing data profiling to derive insights into the data.

BACKGROUND

Various entities may maintain large volumes of data digitally on various computing devices. For example, an organization may maintain columns of data on a series of interconnected servers. It may be generally desirable to inspect and evaluate these volumes of data to determine various insights into various characteristics of the data. However, retrieving and processing large volumes of data may be computationally resource intensive. Further, it may be generally difficult to derive a quality of data given the large amount of information included within the volumes of data.

BRIEF DESCRIPTION OF THE DRAWINGS

Various features and characteristics of the technology will become more apparent to those skilled in the art from a study of the Detailed Description in conjunction with the drawings. Embodiments of the technology are illustrated by way of example and not limitation in the drawings, in which like references may indicate similar elements.

Figure 1:
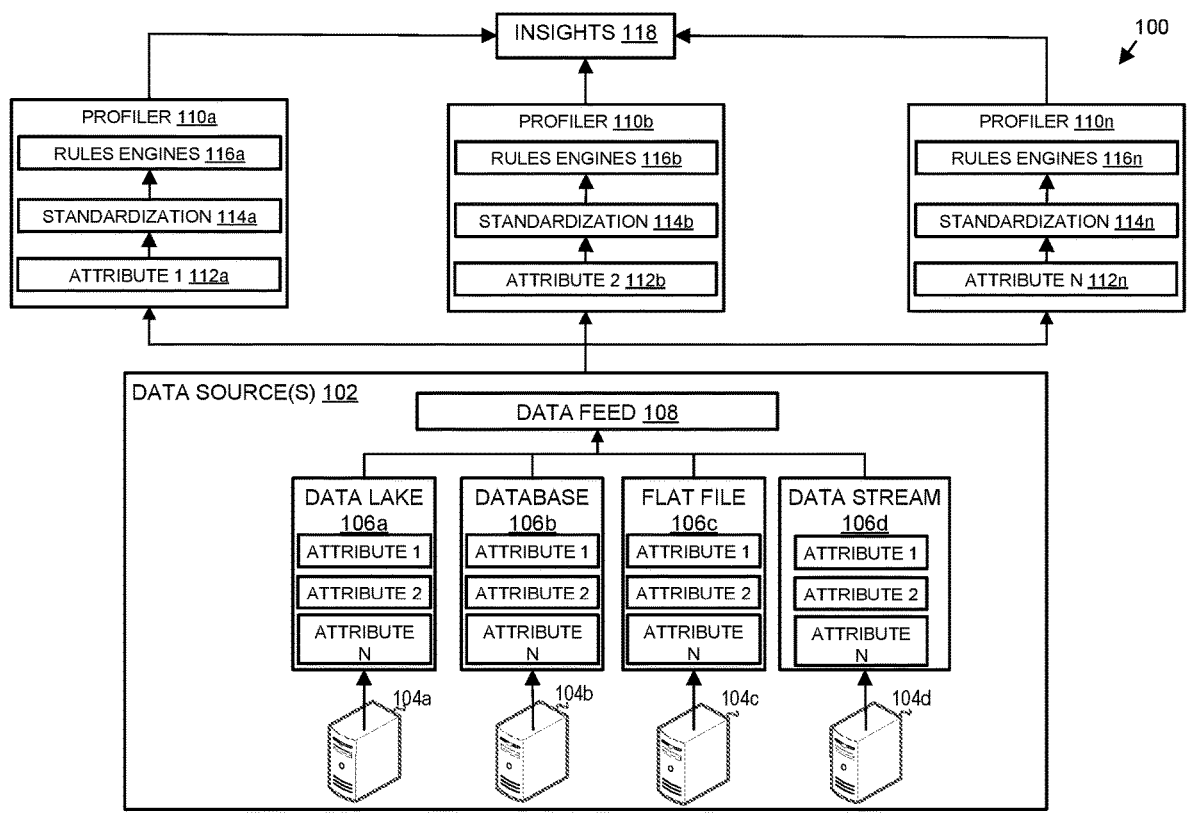
FIG. 1 is an example network architecture in which the present embodiments can be implemented.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

Many entities (e.g., companies, organizations) maintain large volumes of data. This data can be stored in various registries or databases in computing devices. In many cases, these entities may need to identify and match records across disparate data sets as well as gain insights into the data sets. For example, an organization, in view of multiple similar data sets, may attempt to identify and select high quality and accurate datasets among the similar data sets.

The present embodiments relate to processing data and generating insights into the ingested data. A data profiling process can include validation of an attribute of the client data, standardizing the attribute into a standardized format, and processing the data via one or more rules engines. Other information, such as a usage rank or a value score, can be generated based on obtained input information.

The data profiling process can allow for insights into the data to be generated that increases data quality. An example of an insight can include duplicate or multiple instances of data attributes within a domain and across domains, including a percentage overlap. As a further example, an insight can include a data quality report from normalization and standardization (what percent is standard versus non-standard) or trends based on label processing (e.g., records with the same home address).

The embodiments set forth below represent the necessary information to enable those skilled in the art to practice the embodiments and illustrate the best mode of practicing the embodiments. Upon reading the following description in light of the accompanying figures, those skilled in the art will understand the concepts of the disclosure and will recognize applications of these concepts that are not particularly addressed herein. These concepts and applications fall within the scope of the disclosure and the accompanying claims.

Embodiments may be described with reference to particular computer programs, system configurations, networks, etc. However, those skilled in the art will recognize that these features are equally applicable to other computer program types, system configurations, network types, etc. For example, although the term "Wi-Fi network" may be used to describe a network, the relevant embodiment could be deployed in another type of network.

Moreover, the disclosed technology can be embodied using special-purpose hardware (e.g., circuitry), programmable circuitry appropriately programmed with software and/or firmware, or a combination of special-purpose hardware and programmable circuitry. Accordingly, embodiments may include a machine-readable medium having instructions that may be used to program a computing device (e.g., a computing device or a network-accessible server system) to examine data and process the data as described herein.

Terminology

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, may refer to any connection or coupling, either direct or indirect, between two or more elements. The coupling or connection between the elements can be physical, logical, or a combination thereof.

References to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to").

The term "based on" is also to be construed in an inclusive sense rather than an exclusive or exhaustive sense. Thus, unless otherwise noted, the term "based on" is intended to mean "based at least in part on."

The term "module" refers broadly to software components, hardware components, and/or firmware components. Modules are typically functional components that can generate useful data or other output(s) based on specified input(s). A module may be self-contained. A computer program may include one or more modules. Thus, a computer program may include multiple modules responsible for completing different tasks or a single module responsible for completing multiple tasks.

When used in reference to a list of multiple items, the word "or" is intended to cover all of the following interpretations: any of the items in the list, all of the items in the list, and any combination of items in the list.

The sequences of steps performed in any of the processes described herein are exemplary. However, unless contrary to physical possibility, the steps may be performed in various sequences and combinations. For example, steps could be added to, or removed from, the processes described herein. Similarly, steps could be replaced or reordered. Thus, descriptions of any processes are intended to be open-ended.

Data Profiling Overview

A context-driven data profiling process can assist in determining a data quality of source data. Data profiling may include several processing steps that modify input information for generating insights for the data helpful in applications like optimizing matching accuracy. For example, data profiling can standardize and validate data before tokenizing profiled data.

FIG. 1 is a block diagram of an example profiling flow 100. A data profiler can include a flexible data flow. Data can be accessed and/or processed in various batches, continuous streams, or a bulk load from a data source. The data source 102 can include a node (e.g., devices 104a-d) configured to store/maintain data (e.g., data lake 106a, database 106b, flat file 106c, data stream 106d). For example, the data source 102 can include a single column of data, a series of relational databases with a plurality of tables of data, or data lakes with multitudes of data assets.

Data quality can be resolved in the data profiler per use case or client. For example, context can be based on a column of data, a combination of columns of data, or a data source. During a data profiling process, various data can be derived, and a summary of the data can be generated. For instance, a summary of a column of data can be identified in the form of a data sketch. The data sketch can include numeric data and/or string data. Examples of numeric data included in the data sketch can include any of a number of missing values, a mean/variance/max/min of the numeric data, an approximate quantile estimate of numeric data that can be used to generate a distribution or histogram, etc. Examples of string data can include a number of missing values, a maximum character length, minimum character length, mean char length, frequency table of labels, frequency item set, a distinct value estimate, etc.

Once any of a series of metrics are computed in a summary of the data, a data profiling score can be computed. The data profiling score can be used to determine a data quality and/or identify the best data, data composition, and targeting data quality enhancement activities. At user-set intervals, data profiling can be re-executed to recompute the metrics. This can be used to track a history of data scores in the data lifecycle and to enable the flagging of data quality issues.

In some embodiments, the summary of data can include a proportion of values that follow a specific regular expression (e.g., reference data). For instance, for phone numbers that follow a particular format, the summary of data can be indicative of a number of formats that are present.

In some embodiments, the summary of data can include a number of anonymous values. For example, a known anonymous name (e.g., John Doe) can be identified in source data to determine a proportion of the data includes anonymous values.

In other embodiments, the summary of data can include a set of data quality metrics based on a library of data quality rules. The summary of data can be utilized to enable the learning of data quality rules based on reference data associated with an attribute. The summary of data can also be utilized to enable learning of the data quality rules directly from the source data (e.g., between which values should the source data include, what should be a minimum character length).

As a first example, the source data can be inspected to derive a data quality score. The data quality score can include a score that is calculated at a column level or a record level of the source data. The data quality score can be derived from calculating any metrics included in the summary of data.

As another example, the source data can be inspected to identify quality data. For a data profiling score for each column of data in each data source, a best possible set of data can be matched to a specific client. For instance, a table can be prepared that shows a set of columns/attributes (e.g., name, address phone date of birth, email address), a data profiling score for different sources in which the column/attributes are present (CRM, ERP, order management, web). Using the data included in such a table, a set of data with a highest quality of data can be selected for a specific client. In some instances, multiple sources can be matched to receive a highest possible quality of data. This can be performed without undue processing of the source data.

As another example, the source data can be inspected to derive historical data profiling score and perform a what-if analysis. A what-if analysis can include an analysis of what would have been the case if other (certain) rules were invoked on the data. To facilitate computation of these, this can be done on sample data collected from the data summaries created during the computing the metrics stage. If the results of the what-if analysis are sufficient, a new full computation of the metrics can be performed using the new rules selected in the what-if analysis.

Data extracted from data sources (e.g., data lake 106a, database 106b, flat file 106c, data stream 106d) can be fed into profilers (e.g., profilers 110a-n) via a data feed 108. Data feed 108 can include a batch, bulk, or continuous feed of data to profilers. The data fed into profilers can include attributes (e.g., attributes 112a-n). Attributes can be portions of data in a table, in a source, or part of the same record.

In the embodiment as shown in FIG. 1, a first profiler 110a can process attribute 1 112a and a second profiler 110b can process attribute 2 112b. Any suitable number of profilers (e.g., profiler N 110n) can process any number of attributes (e.g., attribute N 112n). Each profiler 110a-n can include a set of standardization rules 114a-n and a set of rules engines 116a-n. The standardization rules 114a-n and/or the rules engines 116a-n can be modular, where each set of rules can be processed for an attribute. Each profiler can process a corresponding attribute using the corresponding set of standardization rules and the set of rules engines. In some embodiments, each profiler can implement various machine learning and/or artificial intelligence techniques and statistical tools to increase data quality in processing the attributes. The resultant data from each profiler 110a-n can include insights 118 indicative of various features of the attributes.

In some embodiments, data quality rules can be adjusted, which can result in different determinations to be made when executing data quality improvement tasks. For instance, a dataset might have a good score, but it was not previously known that a name of "John Doe" was an anonymous (fake or synthetic) value. By updating rules to identify that "John Doe" is an anonymous value, a change in data profiling scores and the history of the scores may be modified. This change in data profiling scores can enable identification of various data included in the dataset.

As another example, the source data can be inspected to derive automatic data quality improvement requests. A trigger can be associated with a data profiling score for a specific attribute or series of attributes. The trigger can state that if a data profiling score is below a threshold, the source data associated with the attribute can be inspected. The source data can be potentially improved if it has an identified value indicative of how the data is used in various contexts.

As another example, the source data can be inspected to derive data insights. Processing data profiling scores of source data can generate distributions of data and other insights that can be utilized in understanding features of the data before initiating another analysis of the data.

As another example, the source data can be inspected to derive smart data quality-based data selection decisioning. Based on mapping the source data to a model (e.g., a canonical model), highly correlated profiling/sampling output, correlated definitions, and/or similar endpoint consumption relationship patterns can provide recommendations for substitutes worthy of inspecting when data quality scores are superior for another dataset with similar attributes. Side-by-side comparisons can be run upon user-initiated requests to help a user identify a measure of overlap and express a relative preference. This can be stored/logged alongside user and community in order to provide recommendations calibrated with user-specific needs longer-term.

Figure 2:
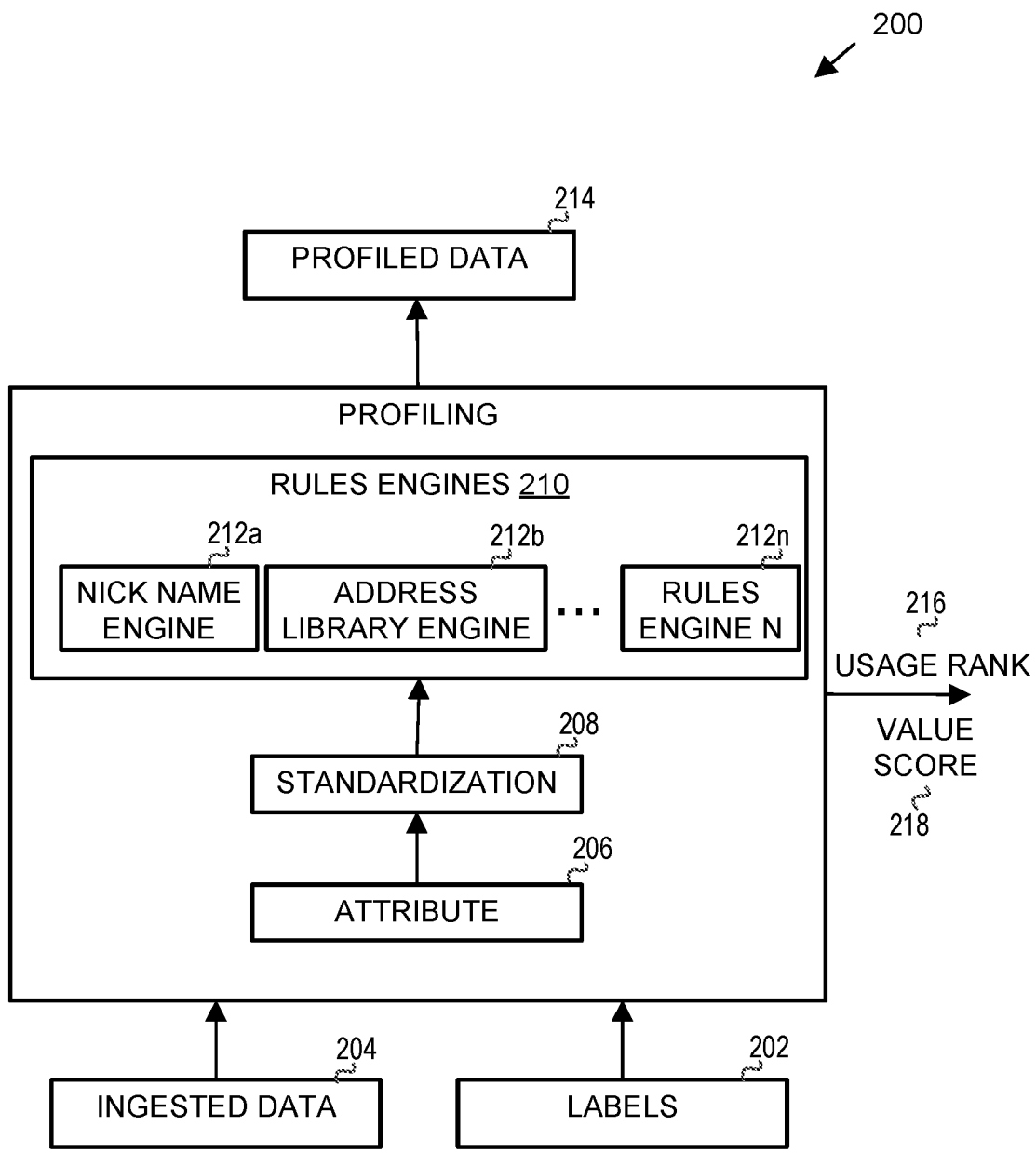
FIG. 2 is a block diagram illustrating an example data profiling process.

FIG. 2 is a block diagram 200 illustrating an example data profiling process. As shown in FIG. 2, data profiling 200 can include obtaining input information. Example input information can include generated context/classification information (or "labels") 202 and/or ingested data 204. The ingested data 204 can include client data.

The data profiling 200 process can include defining attributes 206. An attribute 206 can be indicative of a characteristic or feature of the client data. For example, an attribute 206 can include a date of birth (e.g., Jan. 1, 1990). This can include a month date, day, year date, and/or a full date of birth (DOB). Other example attributes 206 can include an address, name, email address, gender, phone number, social security number, etc. An attribute 206 can also include a label/classification that is indicative of client data.

Data profiling 200 can include standardization 208 of the attributes 206. Standardization 208 can include verification of the data included in the attributes 206 corresponds to the attribute and standardizing a format of the attribute 206 to a uniform format. Data profiling 200 can include multiple standardization processes that can standardize various types of attributes. In many cases, standardization can be modular horizontally and/or vertically. Standardization of attributes is discussed in greater detail with respect to FIG. 3.

The standardized attributes can be processed via one or more rules engines 210. A rules engine can further process a standardized attribute that allows for more insights to be derived from the standardized attribute. Example rules engines 210 can include a nick name engine 212a, address library engine 512b, or any other number of rules engines (e.g., rule engine N 212n).

An address library engine 512b can include identifying whether an attribute includes an address and adding the address to a repository/listing that includes various addresses. The address library engine 512b can associate an address to a client/entity. Upon processing via the rules engine(s) 210, data profiling can output profiled data 514.

As shown in FIG. 2, the profiling process can output any of a usage rank 216 and/or a value score 518. A usage rank 216 can be indicative of a rank of an attribute type in relation to other attribute types. For instance, an attribute for "First Name" can have a higher rank than an attribute for a "gender." The usage rank 216 can be indicative of a quality of information for an attribute type and/or a number of insights associated with the attribute type. For example, an attribute type with a higher usage rank 216 can indicate that more insights can be derived for that attribute type.

As an example, the usage rank 216 can be indicative of a quality of data for each attribute. For instance, in a healthcare context, data may be linked based on an availability for a patient. In this example, the value of data in an identifier such as a social security number (SSN) may generally be high, but the value of data in a patient identifier may be greater than that of the SSN in the healthcare context. In this example, the usage rank can be a series of scores that are indicative of the most unique identifier to identify a patient, as the quality of the resultant data may be of greater value. Accordingly, in this example, the patient identifier attribute may have a greater usage rank than that of a SSN.

As another example, in a corporate context, an employer may give an SSN indicative of an employee a highest usage rank given that the SSN is used to identify employees, such as for payroll purposes.

A value score 218 can be a value that is indicative of various features of an attribute type. For example, a value score 218 can be an aggregated value representative of various characteristics of the attribute type in relation to other attribute types. The value score can provide additional insights into attributes of ingested data. The value score is discussed with greater detail with respect to FIG. 4.

The usage rank and value score can be provided to a network-accessible server system. In some embodiments, profiling 200 can include performing a series of steps to process input information and normalize the input information. For example, processing input information can include removing exceptional values (e.g., foreign characters) or untrue values from raw data. This can normalize the input information and provide information of varying levels of insights about quality of the data.

Figure 3:
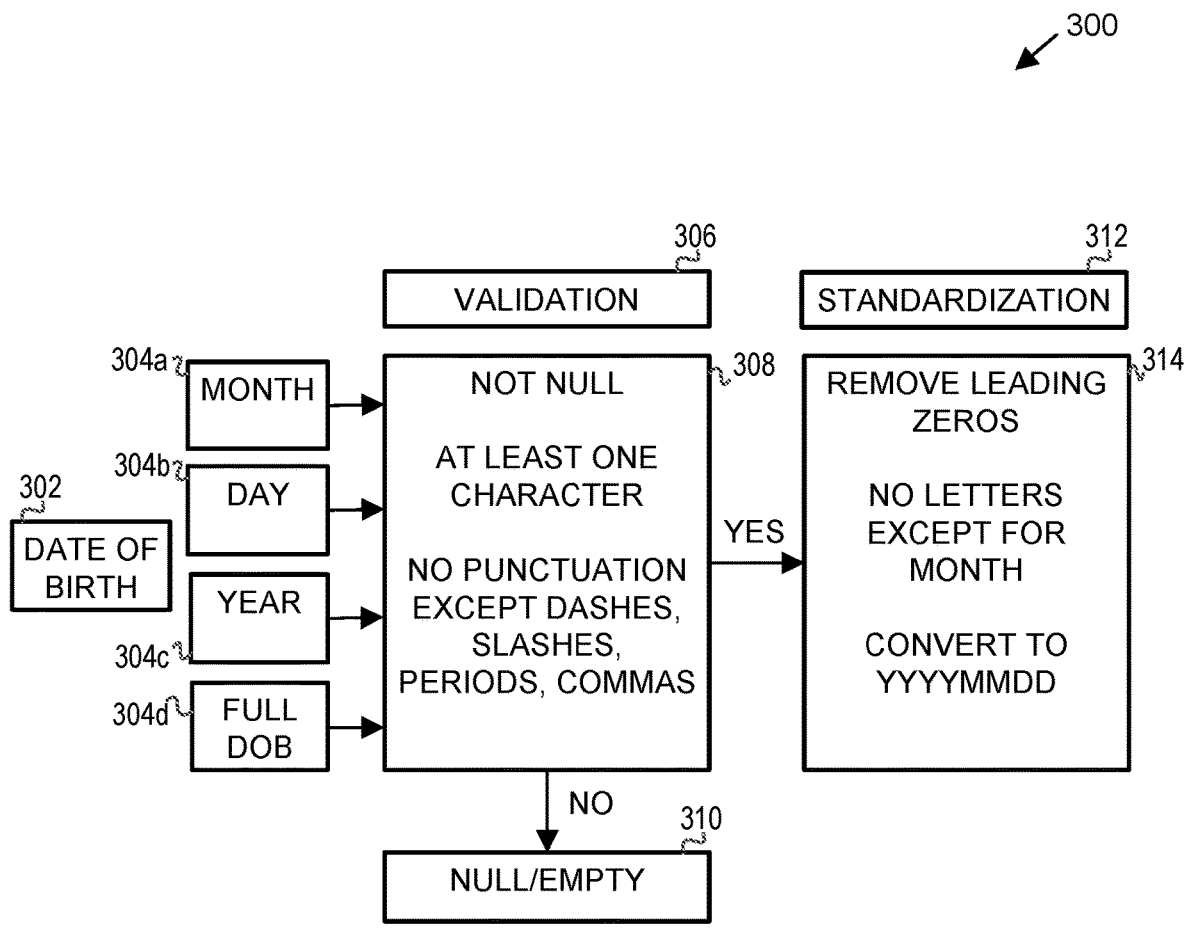
FIG. 3 is a block diagram illustrating an example validation and standardization process.

FIG. 3 is a block diagram 300 illustrating an example validation and standardization process. The process can include obtaining an attribute and processing the attribute to validate and standardize the information comprising the attribute.

As noted above, an example attribute can include a name, date, address, etc. In the example as shown in FIG. 3, the attribute 302 can include a date of birth. The date of birth can include multiple features, such as a month 304a, day 304b, year 304c, and full date of birth (DOB) 304d, for example. For example, the date of birth can be provided as Jan. 1, 1990.

The attribute can be validated via a validation process 306. A set of validation rules 308 may be compared against the features of the attribute (e.g., 304a-d) to determine that the attribute is correctly identified as the attribute. For example, validation rules can determine whether the features of the date of birth actually is indicative of a date of birth. For example, if the attribute is a credit card number instead of a date of birth, the validation rules can identify that the attribute is incorrectly identified as a date of birth. In such an instance, the attribute can be processed by another validation and standardization process relating to a credit card number. If the attribute fails the validation rules, the attribute may be null or empty 310.

The validation rules 308 can include a series of characteristics of the attribute 302 that identifies whether the attribute includes information representing the attribute. For example, a validation rule 308 can inspect the attribute to determine whether the attribute is a null value. For example, if the attribute includes a null value, the attribute does not identify a date of birth and should be identified as a null value 310. Other example validation rules 308 can include determining whether the attribute includes at least one character for a first name, no more than 10 digits for a phone number in the United States, no punctuation except for dashes, slashes, periods, etc. The set of validation rules 308 can be provided for each type of attribute. In some cases, the validation rules can be updated to modify/add/remove any validation rules.

Processed attributes may be inspected to generate value scores for the attribute. A value score may include a value that aggregates information relating to various features of an attribute of ingested data.

Figure 4:
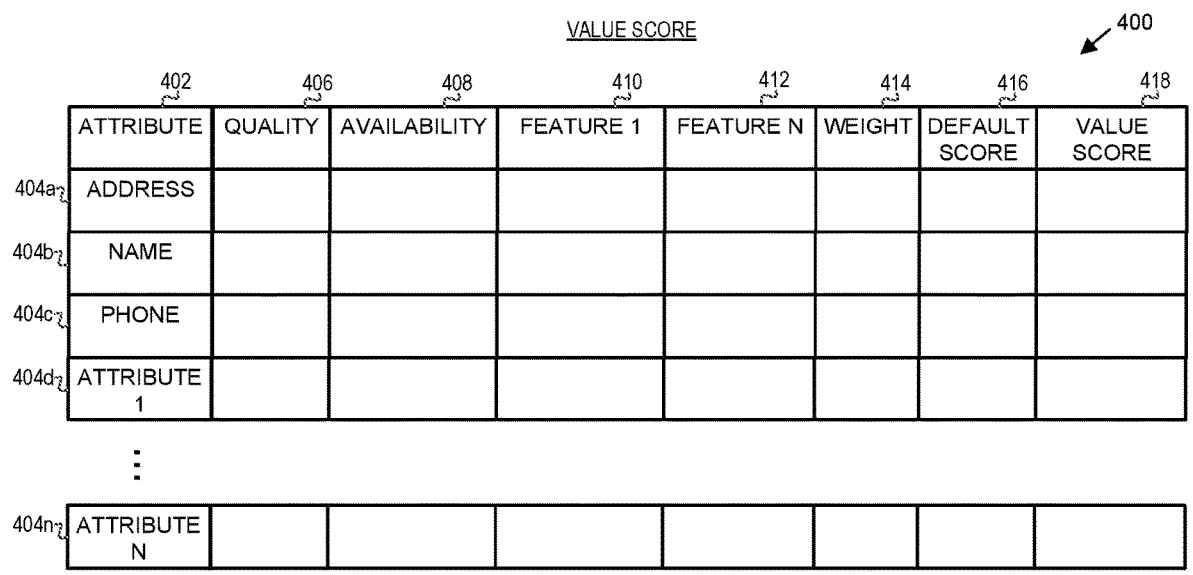
FIG. 4 is a block diagram for generating example value scores for various attributes.

FIG. 4 is a block diagram 400 for generating example value scores for various attributes. As shown in FIG. 4, various attributes 402 of ingested data can be inspected to derive value scores for each attribute 402. Example attributes can include an address 404a, a name 404b, a phone number 404c, and any number of other attribute types (e.g., attribute 1 404d, attribute N 404n).

Various features of each attribute can be utilized in generating a value score. For instance, each attribute can be inspected to derive a quality feature 406 of the attribute. The quality feature 406 can be indicative of a relative difference between the attribute and a standardized version of the attribute. Generally, if an attribute closely corresponds to a standardized version of the attribute, the overall quality of the attribute may be greater. Accordingly, the quality feature 406 can represent a number of modifications of an attribute to provide the attribute in a standardized format. The number of modifications to the attribute to provide the attribute in the standardized format can be converted into a value for the quality feature 406.

Another example feature can include an availability feature 408. The availability feature 408 can be indicative of a number of null/empty entries of an attribute in a subset of the ingested data. For instance, as a number of null/empty entries increases for a column of data, the overall quality of the attribute in that column of data may be lower. Accordingly, a value can be derived for an availability feature 408 based on a number of null/empty entries for that attribute type in relation to other attribute types.

The value score can be based on any suitable number of features (e.g., feature 1 410, feature N 412). Deriving any feature for an attribute type can include inspecting a subset of ingested data (e.g., a column of data) and comparing characteristics of the ingested data with other attribute types to derive features for an attribute type. As an example, a feature 412 can include a cardinality of an attribute, which may be indicative of a uniqueness of the attribute in relation to other attributes.

The value score may be based on a weight 414 of each attribute in relation to other attributes. Each attribute type can be weighed based on other data in a reference dataset that can adjust values of other features for an attribute type.

The features (e.g., features 406, 408, 410, 412) and the determined weight 414 for an attribute may be utilized to derive a default score 416. The default score 416 may be an initial value/score that aggregates values associated with features for an attribute type and can be adjusted based on the weight 414 for the attribute type. In some embodiments, various techniques (e.g., machine learning, neural networks) may be utilized to increase an accuracy in the default score for an attribute. For instance, a default score can be dynamically adjusted using training data that can increase the accuracy in the default scores 416.

The value score 418 can be derived based on the default score 416. As noted above, the value score 418 can include an aggregation of various features for an attribute type. In some instances, the value score(s) 418 can be encrypted and maintained by a network-accessible server system.

Example Method for Implementing a Data Profiling Process

Figure 5:
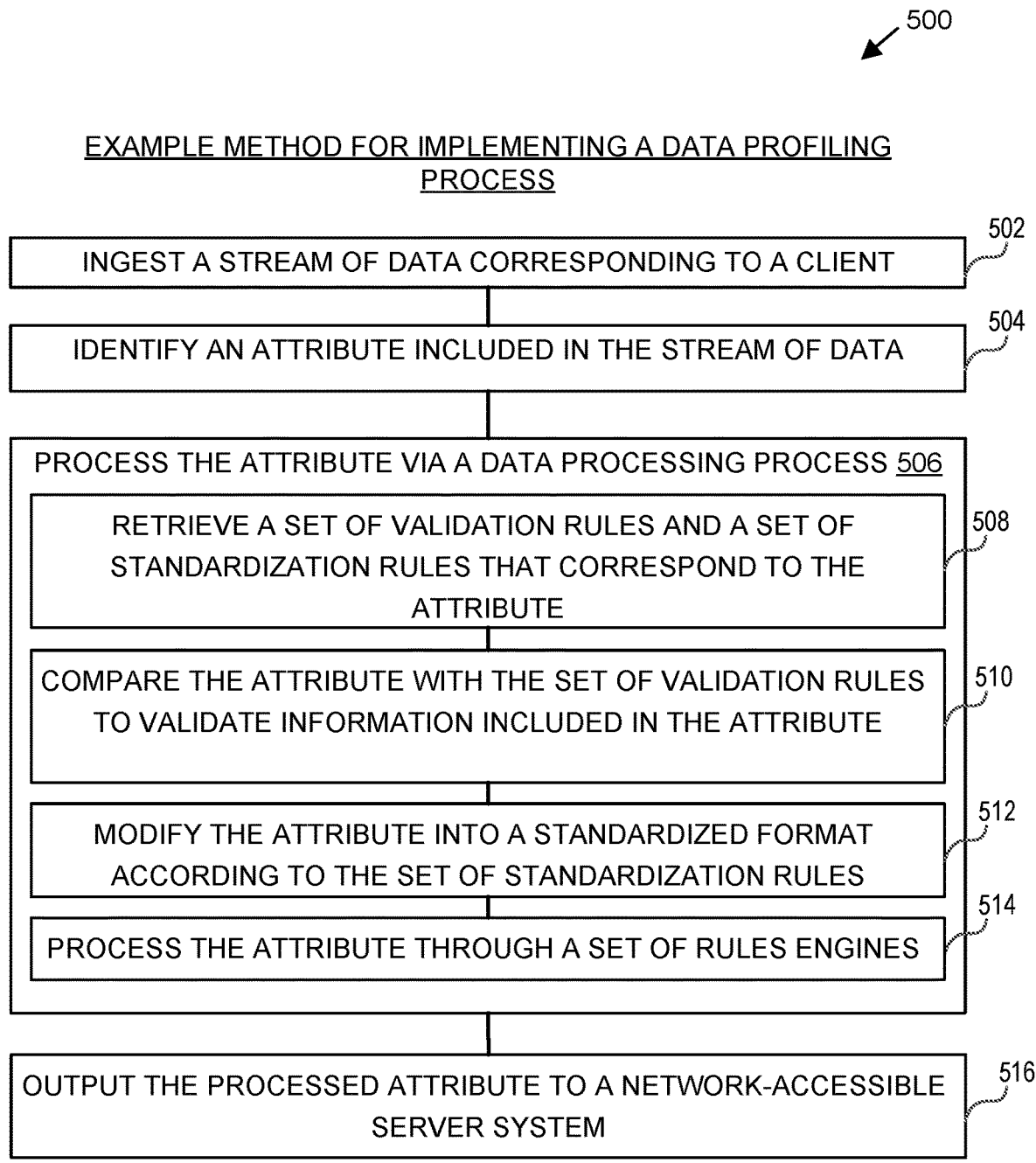
FIG. 5 is a block diagram of an example method for implementing a data profiling process.

FIG. 5 is a block diagram 500 of an example method for implementing a data profiling process. The method may include ingesting a stream of data corresponding to a client (block 502). The stream of data corresponding the client may include one or more columns of client data.

The method may include identifying an attribute from the stream of data (block 504). The method may include processing the attribute via a data profiling process (block 506). The data profiling process may include retrieving a set of validation rules and a set of standardization rules that correspond to the attribute (block 508). The set of validation rules can provide rules indicative of whether the attribute corresponds to the attribute. The set of standardization rules may provide rules to modify the attribute into the standardized format.

The data profiling process may include comparing the attribute with the set of validation rules to determine whether the attribute corresponds to the attribute. (block 510). If it is determined that the attribute corresponds to the attribute, the attribute can be modified, as described herein. In some embodiments, validating the attribute can include determining whether the attribute includes a null value that is identified in the set of validation rules. The attribute can be validated responsive to determining that the attribute does not include the null value.

The data profiling process may include modifying the attribute into a standardized format according to the set of standardization rules (block 512). This may be performed responsive to determining that the attribute is validated via the validation rules.

The data profiling process may include processing the attribute through multiple rules engines (block 514). The rules engines may include a name engine that associates the attribute with commonly associated names included in a listing of associated names, responsive to determining that the attribute is indicative of a name. The rules engines may also include an address library engine that adds the attribute to a library of addresses associated with the client, responsive to determining that the attribute is indicative of an address.

In some embodiments, processing the modified attribute through the set rules engines can include, responsive to determining that the attribute is indicative of a name, processing the modified attribute through a name engine that associates the attribute with associated names included in a listing of associated names. processing the modified attribute through the set rules engines can also include, responsive to determining that the attribute is indicative of an address, processing the modified attribute through an address library engine that adds the attribute to a library of addresses associated with the client.

In some embodiments, the method can include comparing a number of instances of the attribute relative to other attributes in the stream of data. A usage rank can be generated for the attribute. The usage rank can be based on the number of instances of the attribute in the stream of data, and the usage rank may be indicative of a number of insights that are capable of being derived from the attribute.

In some embodiments, a series of features can be identified that are associated with the attribute and identified relative to other attributes in the stream of data. Example features of the series of features can include a quality feature, availability feature, cardinality feature, etc. A value score can be derived for the attribute based on an aggregation of the series of features.

In some embodiments, deriving the value score for the attribute based on the aggregation of the series of features can include processing the attribute to derive a quality feature of the attribute, the quality feature identifies a number of differences between the attribute as identified in the stream of data and the modified attribute modified according to the set of standardization rules. Deriving the value score for the attribute based on the aggregation of the series of features can also include processing the attribute to derive an availability feature of the attribute, the availability feature indicative of a number of null entries in a portion of data in the stream of data that corresponds to the attribute. Deriving the value score for the attribute based on the aggregation of the series of features can also include processing the attribute to derive a cardinality feature of the attribute, the cardinality feature indicative of a difference of the attribute relative to other attributes in the stream of data. Deriving the value score for the attribute based on the aggregation of the series of features can also include aggregating the derived quality feature, availability feature, and cardinality feature of the attribute to generate the value score for the attribute.

The method may include outputting the processed insights/profile/rank/score of the attribute to a network-accessible server system (block 516). The network-accessible server system may maintain insights/profile/rank/score on a series of processed attributes and generate data quality insights into the client data.

Example Method for Implementing a Data Registry Process

Figure 6:
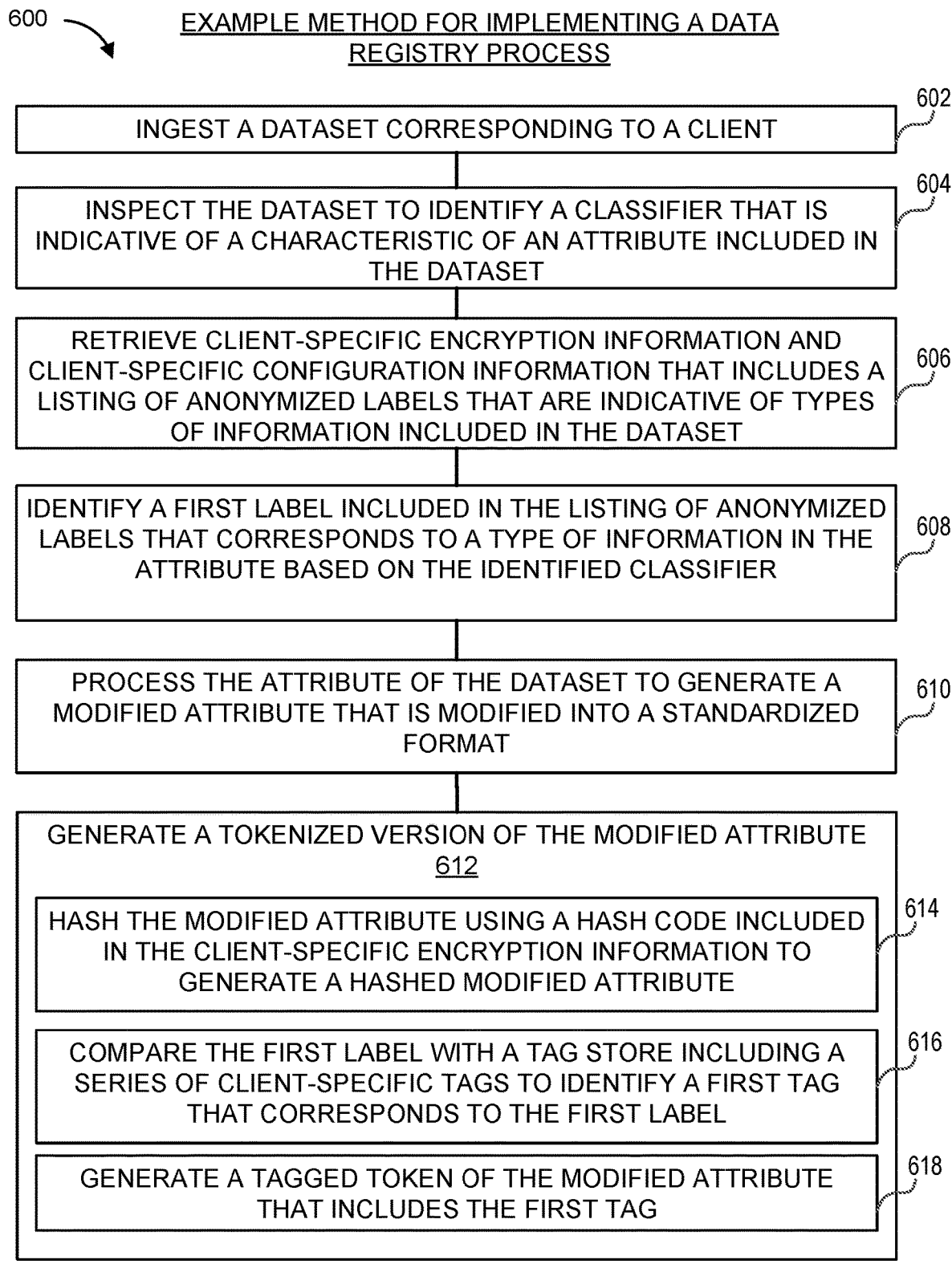
FIG. 6 is a block diagram of an example method for securely classifying and tokenizing data in a data registry process.

In some embodiments, the data profiling process as described herein can be implemented as part of an example data registry process. FIG. 6 is a block diagram of an example method 600 for securely classifying and tokenizing data in a data registry process. As shown in FIG. 6, the method may include ingesting a dataset corresponding to a client (block 602). The dataset may include a series of columns of data relating to a client. This information can be maintained at a client node. In some cases, at least a portion of the data included in the dataset includes personally identifiable information (PII).

The method may include inspecting the dataset to identify a classifier that is indicative of a characteristic of an attribute included in the dataset (block 604). In some embodiments, the classifier includes any of a domain classifier, a subdomain classifier, an attribute classifier, and an entity classifier. In some cases, each classifier can be determined based on inspecting the dataset.

The method may include retrieving client-specific encryption information and client-specific configuration information that includes a listing of anonymized labels that are indicative of types of information included in the dataset (block 606). In some embodiments, the client-specific encryption information may be retrieved from a secure server, the client-specific encryption information can be encrypted using a hashed message authentication code (HMAC) protocol, and wherein the hash code can include a computer-generated SHA2 512/256 token.

The method may include identifying a first label included in the listing of anonymized labels that corresponds to a type of information in the attribute based on the identified classifier; (block 608). A label can provide an anonymized identifier of a type of information represented in the attribute. The label can be generated based on any of the attribute and the classifier. For example, if an attribute relates to a name, the corresponding label can be "La1." In these embodiments, only entities with access to a listing of the information corresponding to the labels can identify the type of information identified by each label, thereby anonymizing the data.

The method may include processing the attribute of the dataset to generate a modified attribute that is modified into a standardized format (block 610). This can include the profiling process as described herein.

In some embodiments, processing the attribute of the dataset to generate the modified attribute further comprises retrieving a set of validation rules and a set of standardization rules that correspond to the first label. The set of validation rules can provide rules indicative of whether the attribute corresponds to the first label. The set of standardization rules can provide rules to modify the attribute into the standardized format. The attribute can be compared with the set of validation rules to determine whether the attribute corresponds to the first label. The attribute can be modified into the standardized format according to the set of standardization rules responsive to determining that the attribute corresponds to the first label.

In some embodiments, processing the attribute of the dataset to generate the modified attribute further comprises processing the attribute using a series of rules engines. The rules engines can include a name engine that associates the attribute with commonly associated names included in a listing of associated names, responsive to determining that the attribute is indicative of a name. The rules engines can also include an address library engine that adds the attribute to a library of addresses associated with the client, responsive to determining that the attribute is indicative of an address.

The method may include generating a tokenized version of the modified attribute (block 612). Generating the tokenized version of the modified attribute can include hashing the modified attribute using a hash code included in the client-specific encryption information to generate a hashed modified attribute (block 614). The hashed modified attribute can be compressed from a 64-character token to a 44-character string using an encoding scheme.

Generating the tokenized version of the modified attribute can also include comparing the first label with a tag store including a series of client-specific tags to identify a first tag that corresponds to the first label (block 616). Generating the tokenized version of the modified attribute can also include generating a contextualized token of the modified attribute that includes the first tag (block 618).

In some embodiments, the tokenized version of the modified attribute can be sent from a remote node to a network-accessible server system.

In some embodiments, responsive to identifying the first label, the method may include generating a first set of insights of the dataset based on the first label and the attribute. Responsive to generating the modified attribute, the methods may also include generating a second set of insights for the dataset based on the modified attribute. The first set of insights and second set of insights can be stored in a network-accessible server system.

Example Processing System

Figure 7:
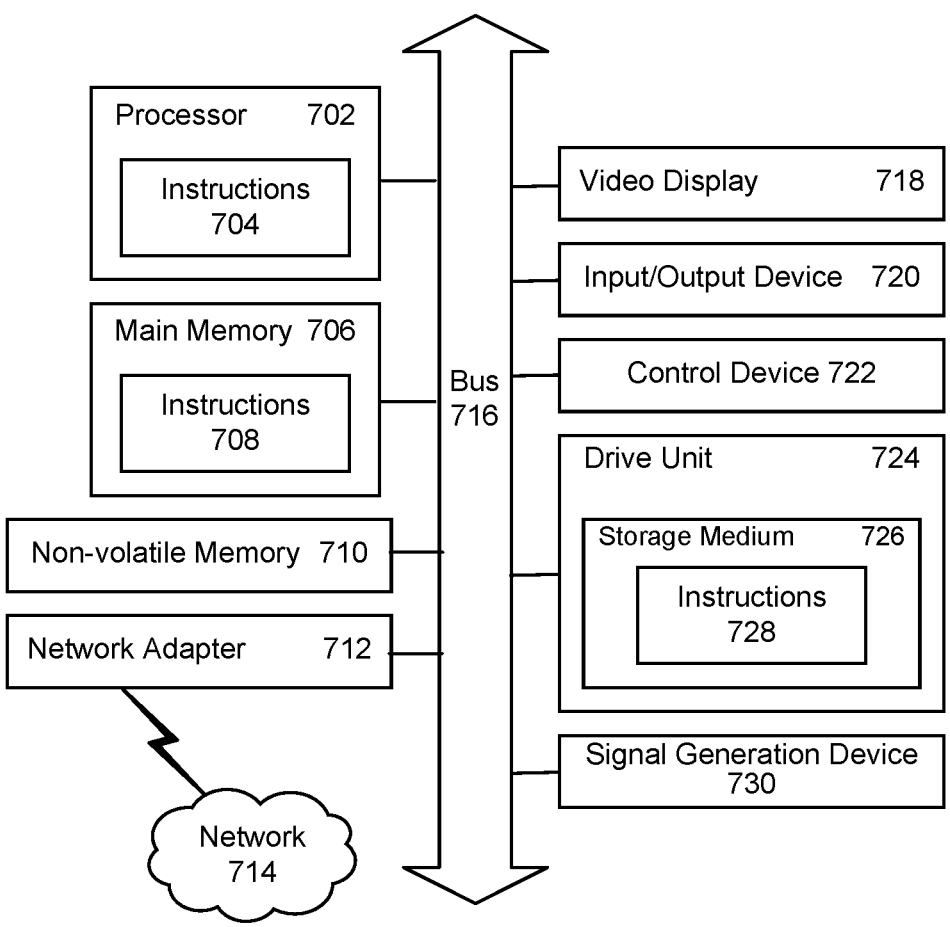
FIG. 7 is a block diagram that illustrates an example of a processing system in which at least some operations described herein can be implemented.

FIG. 7 is a block diagram illustrating an example of a processing system 700 in which at least some operations described herein can be implemented. As shown in FIG. 7, the processing system 700 may include one or more central processing units ("processors") 702, main memory 706, non-volatile memory 710, network adapter 712 (e.g., network interfaces), video display 718, input/output devices 720, control device 722 (e.g., keyboard and pointing devices), drive unit 724 including a storage medium 726, and signal generation device 730 that are communicatively connected to a bus 716. The bus 716 is illustrated as an abstraction that represents any one or more separate physical buses, point to point connections, or both connected by appropriate bridges, adapters, or controllers. The bus 716, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In various embodiments, the processing system 700 operates as part of a user device, although the processing system 700 may also be connected (e.g., wired or wirelessly) to the user device. In a networked deployment, the processing system 700 may operate in the capacity of a server or a client machine in a client-server network environment, or as a peer machine in a peer-to-peer (or distributed) network environment.

The processing system 700 may be a server computer, a client computer, a personal computer, a tablet, a laptop computer, a personal digital assistant (PDA), a cellular phone, a processor, a web appliance, a network router, switch or bridge, a console, a hand-held console, a gaming device, a music player, network-connected ("smart") televisions, television-connected devices, or any portable device or machine capable of executing a set of instructions (sequential or otherwise) that specify actions to be taken by the processing system 700.

While the main memory 706, non-volatile memory 710, and storage medium 726 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 728. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 704, 708, 728) set at various times in various memory and storage devices in a computer, and that, when read and executed by one or more processing units or processors 702, cause the processing system 700 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution. For example, the technology described herein could be implemented using virtual machines or cloud computing services.

Further examples of machine-readable storage media, machine-readable media, or computer-readable (storage) media include, but are not limited to, recordable type media such as volatile and non-volatile memory devices 710, floppy and other removable disks, hard disk drives, optical disks (e.g., Compact Disk Read-Only Memory (CD ROMS), Digital Versatile Disks (DVDs)), and transmission type media, such as digital and analog communication links.

The network adapter 712 enables the processing system 700 to mediate data in a network 714 with an entity that is external to the processing system 700 through any known and/or convenient communications protocol supported by the processing system 700 and the external entity. The network adapter 712 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 712 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the techniques introduced here implemented by, for example, programmable circuitry (e.g., one or more microprocessors), programmed with software and/ or firmware, entirely in special-purpose hardwired (i.e., non-programmable) circuitry, or in a combination or such forms. Special-purpose circuitry can be in the form of, for example, one or more application-specific integrated circuits From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A computer-implemented method comprising:
ingesting a stream of data that corresponds to a client;
identifying an attribute included in the stream of data;
comparing a number of instances of the attribute relative to other attributes in the stream of data;
generating a usage rank for the attribute, the usage rank based on the number of instances of the attribute in the stream of data, wherein the usage rank is indicative of a number of insights that are capable of being derived from the attribute;
retrieving client-specific configuration information that includes a listing of labels, wherein each label in the listing of labels provides a client-specific indication of a type of information included in the stream of data;
identifying a first label included in the listing of labels that is indicative of information included in the attribute;
comparing the first label with a tag store including a series of client-specific tags to identify a first tag that corresponds to the first label;
processing the attribute in a data profiling process, the data profiling process including:
retrieving a set of validation rules and a set of standardization rules that correspond to the attribute, wherein the set of validation rules and the set of standardization rules correspond to the first label;
comparing the attribute with the set of validation rules to validate information included in the attribute;
responsive to determining that the information included in the attribute is validated according to the set of validation rules, modifying the attribute into a standardized format according to the set of standardization rules; and
processing the modified attribute through a set of rules engines;
generating a tokenized version of the processed attribute that includes the first tag;
outputting the tokenized version of the processed attribute to a network-accessible server system; and
deriving a quality feature value of the processed attribute, wherein the quality feature value is calculated based on a number of modifications to convert the processed attribute to a standardized version of the processed attribute.

2. The computer-implemented method of claim 1, wherein processing the modified attribute through the set of rules engines further comprises:
responsive to determining that the attribute is indicative of a name, processing the modified attribute through a name engine that associates the attribute with associated names included in a listing of associated names; and
responsive to determining that the attribute is indicative of an address, processing the modified attribute through an address library engine that adds the attribute to a library of addresses associated with the client.

3. The computer-implemented method of claim 1, further comprising:

identifying a series of features associated with the attribute that are identified relative to other attributes in the stream of data; and
deriving a value score for the attribute based on an aggregation of the series of features.

4. The computer-implemented method of claim 3, wherein deriving the value score for the attribute based on the aggregation of the series of features further comprises:
processing the attribute to derive an availability feature of the attribute, the availability feature indicative of a number of null entries in a portion of data in the stream of data that corresponds to the attribute;
processing the attribute to derive a cardinality feature of the attribute, the cardinality feature indicative of a difference of the attribute relative to other attributes in the stream of data;
aggregating the derived availability feature, and the derived cardinality feature of the attribute to generate the value score for the attribute.

5. The computer-implemented method of claim 3, wherein comparing the attribute with the set of validation rules to validate information included in the attribute further comprises:
determining whether the attribute includes a null value that is identified in the set of validation rules, wherein the attribute is validated responsive to determining that the attribute does not include the null value.

6. A method performed by a computing node to generate a modified attribute of a dataset, the method comprising:
ingesting a dataset from a client node that corresponds to a client;
identifying an attribute from the dataset;
comparing a number of instances of the attribute relative to other attributes in the dataset;
generating a usage rank for the attribute based on the number of instances of the attribute in the dataset;
identifying a series of features associated with the attribute that are identified relative to other attributes in the dataset;
deriving a value score for the attribute based on an aggregation of the series of features;
retrieving client-specific configuration information that includes a listing of labels, wherein each label in the listing of labels provides a client-specific indication of a type of information included in the dataset;
identifying a first label included in the listing of labels that is indicative of information included in the attribute;
comparing the first label with a tag store including a series of client-specific tags to identify a first tag that corresponds to the first label;
retrieving a set of validation rules and a set of standardization rules that correspond to the attribute, wherein the set of validation rules and the set of standardization rules correspond to the first label;
comparing the attribute with the set of validation rules to validate information included in the attribute;
responsive to determining that the information included in the attribute is validated according to the set of validation rules, modifying the attribute into a standardized format according to the set of standardization rules;
processing the modified attribute through a set of rules engines;
generating a tokenized version of the processed attribute that includes the first tag;
outputting the tokenized version of the processed attribute to a network-accessible server system;

deriving a quality feature value of the processed attribute, wherein the quality feature value is calculated based on a number of modifications to convert the processed attribute to a standardized version of the processed attribute.

7. The method of claim 6, wherein processing the modified attribute through the set of rules engines further comprises:
   responsive to determining that the attribute is indicative of a name, processing the modified attribute through a name engine that associates the attribute with associated names included in a listing of associated names; and
   responsive to determining that the attribute is indicative of an address, processing the modified attribute through an address library engine that adds the attribute to a library of addresses associated with the client.

8. The method of claim 6, wherein deriving the value score for the attribute based on the aggregation of the series of features further comprises:
   processing the attribute to derive an availability feature of the attribute, the availability feature indicative of a number of null entries in the portion of data in the dataset that corresponds to the attribute;
   processing the attribute to derive a cardinality feature of the attribute, the cardinality feature indicative of a difference of the attribute relative to other attributes in the dataset;
   aggregating the availability feature, and cardinality feature of the attribute to generate the value score for the attribute.

9. The method of claim 6, wherein comparing the attribute with the set of validation rules to validate information included in the attribute further comprises:
   determining whether the attribute includes a null value that is identified in the set of validation rules, wherein the attribute is validated responsive to determining that the attribute does not include the null value.

10. A tangible, non-transient computer-readable medium having instructions stored thereon that, when executed by a processor, cause the processor to:
    ingest a stream of data that corresponds to a client;
    identify an attribute included in the stream of data;
    compare a number of instances of the attribute relative to other attributes in the stream of data;
    generate a usage rank for the attribute, the usage rank based on the number of instances of the attribute in the stream of data, wherein the usage rank is indicative of a number of insights that are capable of being derived from the attribute;
    retrieve client-specific configuration information that includes a listing of labels, wherein each label in the listing of labels provides a client-specific indication of a type of information included in the stream of data;
    identify a first label included in the listing of labels that is indicative of information included in the attribute;
    compare the first label with a tag store including a series of client-specific tags to identify a first tag that corresponds to the first label;
    process the attribute in a data profiling process, the data profiling process including:
       retrieve a set of validation rules and a set of standardization rules that correspond to the attribute, wherein the set of validation rules and the set of standardization rules correspond to the first label;
       compare the attribute with the set of validation rules to validate information included in the attribute;
       responsive to determining that the information included in the attribute is validated according to the set of validation rules, modify the attribute into a standardized format according to the set of standardization rules; and
       process the modified attribute through a set of rules engines;
    generate a tokenized version of the processed attribute that includes the first tag;
    output the tokenized version of the processed attribute to a network-accessible server system;
    derive a quality feature value of the processed attribute, wherein the quality feature value is calculated based on a number of modifications to convert the processed attribute to a standardized version of the processed attribute.

11. The computer-readable medium of claim 10, wherein processing the modified attribute through the set of rules engines further comprises:
    responsive to determining that the attribute is indicative of a name, process the modified attribute through a name engine that associates the attribute with associated names included in a listing of associated names; and
    responsive to determining that the attribute is indicative of an address, process the modified attribute through an address library engine that adds the attribute to a library of addresses associated with the client.

12. The computer-readable medium of claim 10, further causing the processor to:
    identify a series of features associated with the attribute that are identified relative to other attributes in the stream of data, the series of features used to identify a value score for the attribute.

13. The computer-readable medium of claim 12, further causing the processor to:
    process the attribute to derive an availability feature of the attribute, the availability feature indicative of a number of null entries in a portion of data in the stream of data that corresponds to the attribute;
    process the attribute to derive a cardinality feature of the attribute, the cardinality feature indicative of a difference of the attribute relative to other attributes in the stream of data; and
    aggregate the availability feature, and cardinality feature of the attribute to derive the value score for the attribute.

14. The computer-readable medium of claim 10, wherein said compare the attribute with the set of validation rules to validate information included in the attribute further comprises:
    determine whether the attribute includes a null value that is identified in the set of validation rules, wherein the attribute is validated responsive to determining that the attribute does not include the null value.

* * * * *